US012680973B2

(12) United States Patent
Mahel et al.

(10) Patent No.: US 12,680,973 B2
(45) Date of Patent: Jul. 14, 2026

(54) SECONDARY ELECTRON DETECTOR FOR ION BEAM SYSTEMS

(71) Applicant: FEI Company, Hillsboro, OR (US)

(72) Inventors: Vojtěch Mahel, Boršice u Blatnice (CZ); Branislav Straka, Brno (CZ); Libor Novák, Brno (CZ); Jeremy Graham, Portland, OR (US)

(73) Assignee: FEI Company, Hillsboro, OR (US)

( * ) Notice: Subject to any disclaimer, the term of this patent is extended or adjusted under 35 U.S.C. 154(b) by 376 days.

(21) Appl. No.: 18/475,637

(22) Filed: Sep. 27, 2023

(65) Prior Publication Data

US 2025/0102451 A1 Mar. 27, 2025

(51) Int. Cl.
*G01N 23/2251* (2018.01)
*G01N 23/203* (2006.01)

(52) U.S. Cl.
CPC ....... *G01N 23/2251* (2013.01); *G01N 23/203* (2013.01); *G01N 2223/505* (2013.01)

(58) Field of Classification Search
CPC ............. G01N 23/2251; G01N 23/203; G01N 2223/505; H01J 37/00; H01J 37/02; H01J 37/244; H01J 37/20; H01J 37/26; H01J 37/28; H01J 37/3056
USPC .................................. 250/306, 307, 310, 311
See application file for complete search history.

(56) References Cited

U.S. PATENT DOCUMENTS

| | | | | |
|---|---|---|---|---|
| 5,093,572 A | * | 3/1992 | Hosono ................... | H01J 37/28 |
| | | | | 250/306 |
| 2011/0121176 A1 | * | 5/2011 | Sijbrandij .......... | G01N 23/2251 |
| | | | | 250/306 |
| 2017/0154752 A1 | * | 6/2017 | Essers ..................... | H01J 37/18 |

* cited by examiner

*Primary Examiner* — Jason L Mccormack
(74) *Attorney, Agent, or Firm* — Leron Vandsburger

(57) ABSTRACT

Dual beam charged particle microscopy systems, sensors, and techniques are disclosed. A charged particle microscope system can include a vacuum chamber, a sample stage disposed in the vacuum chamber, a first beam source operable to direct a first particle beam into the vacuum chamber, a second beam source operable to direct a second particle beam into the vacuum chamber, a first charged particle sensor, and a second charged particle sensor. The first charged particle sensor can include a detector cell having a semiconductor layer characterized by a bandgap equal to or greater than about 2.0 eV, oriented to detect secondary electrons generated based on an interaction between the first particle beam or the second particle beam and the sample. The second charged particle sensor can include a scintillator detector configured to be saturated from electrons generated based on an interaction between the second particle beam and the sample.

10 Claims, 9 Drawing Sheets

200

105

115

230

235

242

240

246

125

120

130

244

PFIB ON e⁻ BEAM ON

PFIB OFF e⁻ BEAM ON

WIDE BANDGAP DETECTOR

ETD DETECTOR

CAUSE EMISSION OF AN ELECTRON BEAM DIRECTED ONTO A SAMPLE <u>802</u>

CAUSE EMISSION OF AN ION BEAM DIRECTED ONTO THE SAMPLE <u>804</u>

CAUSE THE EMISSION OF THE ION BEAM TO STOP <u>806</u>

DETECT A SIGNAL AT A CHARGED PARTICLE SENSOR IN THE SAMPLE CHAMBER <u>808</u>

SECONDARY ELECTRON DETECTOR FOR ION BEAM SYSTEMS

The present disclosure is directed to electron microscopy components, systems, and methods. More particularly, the present disclosure describes sensor components for improved detection of secondary electrons.

BACKGROUND

In charged particle microscopy, secondary electrons are produced by the inelastic scattering of a beam of electrons as the beam interacts with the atoms of a sample. Secondary electrons originate near the surface of the sample material and are therefore useful for determining properties of the sample surface. In particular, secondary electrons are useful for imaging the surface of samples at high resolution. Secondary electrons may also be generated from the inter-actions of other types of beams used in microscope systems, including ion beams and laser beams used to, for example, mill or etch the surface of the sample.

Conventionally, secondary electrons are detected with a scintillator detector, for example, an Everhart-Thornley detector. Such a detector operates by collecting the second-ary electrons with a low-level electric field, converting the secondary electrons to photons with a scintillator medium, and then converting the photons to a detectable electrical signal via a photomultiplier tube. Because the scintillator in such detectors continues to phosphoresce (e.g., produce photons) for up to several seconds after interacting with a collected electron, the scintillator detector can saturate with a sufficient electron flux from the sample. There is a need, therefore, for improved detection techniques for secondary electrons in dual beam electron microscope systems.

BRIEF SUMMARY

The techniques described herein are directed to systems, detector apparatuses, and methods for detecting secondary electrons in charged particle microscope systems. One embodiment is directed to a charged particle microscope system. The charged particle microscope system can include a vacuum chamber, a sample stage disposed in the vacuum chamber and configured to receive a sample to be tested in the vacuum chamber, a first beam source operable to direct a first particle beam into the vacuum chamber toward the sample stage, a second beam source operable to direct a second particle beam into the vacuum chamber toward the sample stage, a first charged particle sensor, and a second charged particle sensor. The first charged particle sensor can be disposed at a first location in the vacuum chamber and can include a detector cell. The detector cell can have a semiconductor layer electrically biased across at a first level and characterized by a bandgap equal to or greater than about 2.0 eV. The first charged particle sensor can be oriented to detect secondary electrons generated based on an interaction between the first particle beam or the second particle beam and a sample disposed on the sample stage. The second charged particle sensor can be disposed at a second location in the vacuum chamber and can include a scintillator detector electrically biased at a second level greater than the first level. The second charged particle sensor can be configured to be saturated from electrons generated based on an interaction between the second par-ticle beam and the sample disposed on the sample stage.

The charged particle microscope system can also include that the first level is about 1 kV.

The charged particle microscope system can also include that the second level is about 10 kV.

The charged particle microscope system can also include that the first location is closer to the sample stage than the second location.

The charged particle microscope system can also include a distance between the first location and the sample stage is about 7 mm to about 10 cm.

The charged particle microscope system can also include a distance between the second location and the sample stage is about 10 cm.

The charged particle microscope system can also include the semiconductor layer having one or more materials selected from a group consisting of silicon carbide, single crystalline diamond, polycrystalline diamond, gallium nitride, gallium phosphide, cadmium sulfide, aluminum phosphide, zinc selenide, zinc sulfide, and aluminum nitride.

The charged particle microscope system can also include the first particle beam is an electron beam.

The charged particle microscope system can also include the second particle beam is an ion beam, or wherein the second particle beam is a laser beam. The ion beam can be configured for milling or polishing.

Another embodiment is directed to a charged particle sensor. The charged particle sensor includes a housing configured to be incorporated into a charged particle micro-scope system and a detector cell mechanically coupled with the housing. The detector cell can include a semiconductor layer characterized by a bandgap equal to or greater than about 2.0 eV. The housing can be configured to be mechani-cally coupled with the charged particle microscope system so that, when the housing is mechanically coupled with the charged particle microscope system, the charged particle sensor is disposed in a chamber of the charged particle microscope system and oriented to detect secondary elec-trons from a sample.

The charged particle sensor can also include that the housing can be configured to be mechanically coupled with an end of an ion beam column, and wherein the housing and the detector cell form an annular configuration at the end of the ion beam column.

The charged particle sensor can also include that the housing is configured to be mechanically coupled with the charged particle microscope system at a location having an angle of about 45° between an axis of an electron beam and a line from the sample to the detector cell.

The charged particle sensor can also include that the detector cell is electrically biased across the semiconductor layer at a voltage from about 0.01 V to about 10 kV.

Still another embodiment is directed to a method of operating a charged particle microscope system. The method can include causing emission of an electron beam directed onto a sample positioned in a sample chamber. The electron beam can generate a first flux of detectable particles. The method can also include causing emission of an ion beam directed onto the sample in the sample chamber. The ion beam can generate a second flux of detectable particles greater than the first flux. The method can also include causing the emission of the second particle beam to stop and detecting a signal at a charged particle sensor in the sample chamber. The charged particle sensor can include a detector cell having a semiconductor layer characterized by a band-gap equal to or greater than about 2.0 eV. The signal can be produced by the first flux of detectable particles associated with the first particle beam.

The method can also include that detecting the signal at the charged particle sensor occurs after a desaturation of the charged particle sensor. The desaturation can occur less than about 100 μs after causing the emission of the second particle beam to stop.

The method can also include that detecting the signal at the charged particle sensor omits the use of a conductive collector mesh coupled to the charged particle sensor.

The method can also include that causing the emission of the first particle beam occurs less than about 100 μs after causing the emission of the second particle beam to stop.

The method can also include that detecting the signal at the charged particle sensor can include detecting secondary electrons produced based on an interaction between the first particle beam and a sample in the sample chamber.

The method can also include that detecting the signal at the charged particle sensor can include detecting backscattered electrons produced by a scattering of the first particle beam from a sample in the sample chamber.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

FIG. 7 is a schematic diagram of a wide bandgap detector in a dual beam charged particle microscope positioned at an end of an ion beam column, according to some embodiments.

Figure 1:
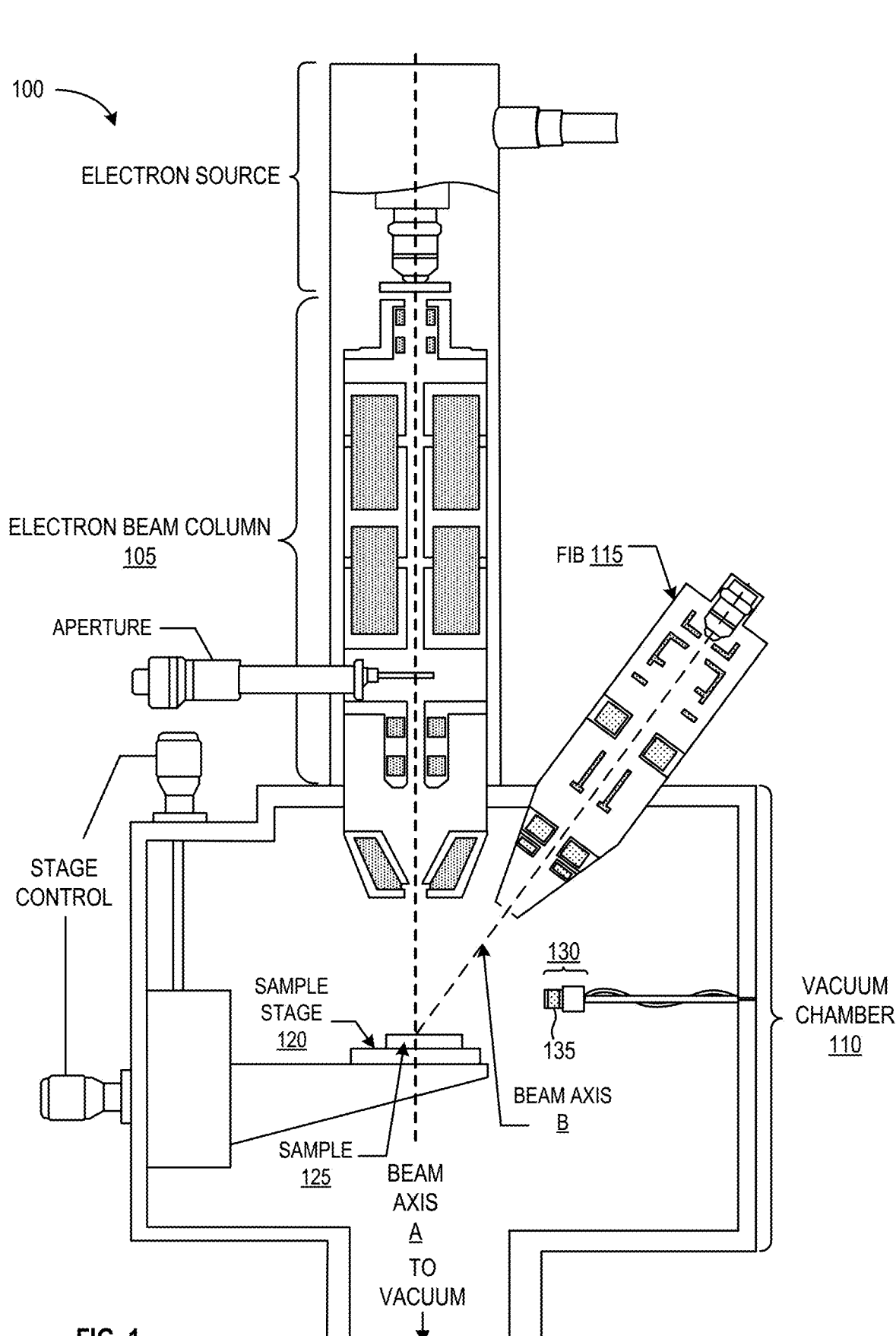
FIG. 1 is a schematic diagram of an example dual beam charged particle microscope, according to some embodiments.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While exemplary embodiments have been illustrated and described, it will be appreciated that various changes can be made therein without departing from the spirit and scope of the disclosure.

Charged particle microscopy can produce secondary electrons from the interaction of a beam of electrons with atoms of a sample, in particular inelastic collisions of the electrons in the beam with the atoms of the sample. The secondary electrons can be detected to determine surface features of the sample, including imaging of the topography of the sample's surface. In contrast with backscattered electrons (BSEs), which are produced by elastic scattering of the electrons in the beam from deeper in the sample, the secondary electrons typically have a much lower energy (up to around 50 eV). Due to the lower energy, conventional detectors used for secondary electron detection employ a charged collection grid to guide the emitted secondary electrons toward the detector. Because BSEs are typically scattered backward near to the axis of the incident electron beam, the positioning of the secondary electron detectors is usually away from the beam axis and the sample. The BSEs can be detected with solid state detectors with narrow bandgaps (e.g., 1.1-2.0 eV) such as doped silicon. Recently, detectors having wide bandgaps greater than 2.0 eV have been used for improved noise reduction from thermal photons for detection of BSEs. The application of such wide bandgap materials to the detection of secondary electrons is the focus of the following description.

Systems for use with charged particle microscopy can include "dual beam" systems that have both a beam of electrons used in scanning electron microscopy (SEM), transmission electron microscopy (TEM), and/or scanning transmission electron microscopy (STEM), and another particle beam for use for milling, polishing, etching, ablation, surface preparation, site analysis, deposition, and other techniques. The other beam can include ion beams or laser beams, including focused ion beams (FIBs). For example, a dual beam system can include a plasma focused ion beam (PFIB) that can direct a beam of ions at a sample to remove material from the sample surface to prepare a lamella. To verify the milling process, the electron beam can be used to image the sample. The beams can be operated alternately to mill and verify to ensure precise removal of material. For example, the electron beam can be activated to produce an image of the surface of the sample. Based on the image, the PFIB can be precisely targeted and activated to remove material from the sample. The PFIB can then be deactivated and the electron beam reactivated to obtain another image of the sample to verify the previous milling operation. The PFIB can then be re-activated to continue milling, and the process repeated. Although the following description primarily refers to dual beam systems, charged particle microscopy can include multi-beam systems having an electron beam, an ion beam, and a laser beam or a second ion beam.

The conventional detector for detecting secondary electrons is an Everhart-Thornley detector (ETD). An ETD includes a scintillator coupled to a photomultiplier tube. A charged collection grid at the front of the ETD can guide secondary electrons toward the scintillator. A high-voltage potential (about 10 kV) can then accelerate the captured electrons to sufficient energy within the scintillator to cause phosphorescence and the emission of photons, which are then guided to the photomultiplier tube for amplification into a detectable electrical signal. The collected signal is coordinated with a raster pattern of the beam of electrons to produce an image of the sample surface.

Unfortunately, the operation of a focused ion beam like a PFIB produces a substantial flux of electrons (and other particles) from the sample. Since the phosphorescence in the scintillator in an ETD can take some time to relax (from milliseconds to several seconds, depending on the material), the high flux from the PFIB operation can saturate the scintillator of the ETD. While saturated, the captured signal cannot be used to produce useful images from the electron beam while operating as an SEM. Thus, operating the PFIB and then switching to the electron beam may require several seconds before a usable image of the sample surface can be acquired, as the ETD scintillator relaxes. Considering the alternate operation of the electron beam and ion beam in a dual beam system, the delay due to saturation of the ETD can introduce substantial constraints on the throughput of sample preparation via milling with a PFIB.

To avoid the saturation of the ETD detector in dual beam charged particle microscopy systems (e.g., SEM-(P)FIB systems), embodiments of the present disclosure include secondary electron detectors with semiconductor materials having a bandgap above about 2 eV. Such semiconductor materials can include $sp^3$-hybridized carbon (e.g., diamond or diamond-like carbon) having bandgaps of about 5.5 eV. These wide bandgap detectors can be used in addition to or as an alternative to the conventional ETD in a dual beam system. Incident electrons (e.g., secondary electrons) can interact with the wide bandgap semiconductor material to produce electron-hole pairs in the material. The electron-hole pairs can be separated with a biasing voltage applied across the material to generate a detectable current. For wide bandgap detectors, in some examples the biasing voltage may be on the order of 1 kV, while the semiconductor material may be sensitive to secondary electrons having energies less than 50 eV. Accordingly, a wide bandgap detector may be placed closer to a sample during electron beam and/or ion beam operation in a dual beam system without affecting (e.g., deflecting) the charged particle beams. In some other examples, the biasing voltage may be up to 10 kV. In addition, the wide bandgap detectors can be used with or without the charged collection grid, allowing for even more options for positioning the detector within a sample chamber of a dual beam system. Advantageously, such flexibility, especially in view of typically limited space in a charged particle microscope sample chamber, permits additional measurement modalities to be implemented concurrently without sacrificing secondary electron imaging, which can be useful for visual assessment of surface condition and position on a sample. When the wide bandgap detector is used with a charged collection grid, the grid voltage can be set in conjunction with the biasing voltage across the semiconductor material to improve the collected signal.

By using a wide bandgap detector in a dual beam system, numerous advantages are obtained over conventional systems employing an ETD or other scintillator detector. For example, the wide bandgap detector does not saturate with exposure to the higher particle flux induced by a particle beam used for milling. A dual beam system can therefore be switched from the ion beam used for milling to the electron beam used for secondary electron imaging and a usable SEM imaging signal can be immediately obtained (e.g., in less than about 100 μs) from the wide bandgap detector, as opposed to seconds for a scintillator detector. Milling, etching, polishing, and other sample preparation operations can be performed substantially faster (on the order of several minutes faster for lamella preparation), allowing for a correspondingly increased throughput of sample preparation operations. As another example, the lower biasing voltage of the wide bandgap detector can allow for placement of the detector closer to the sample, which can allow for the detection of secondary electrons without using a charged collection grid. In some examples, the wide bandgap detector may be positioned in locations oriented more obliquely to the sample surface (e.g., at a greater angle from the electron beam axis A) without affecting the electron beam, improving the imaging of certain surface features based at least in part on low-angle shadowing effects.

FIG. 1 is a schematic diagram of an example dual beam charged particle microscope 100, according to some embodiments. The charged particle microscope 100 includes multiple sections including an electron source, a beam column 105, and a vacuum chamber 110. The electron source includes high-voltage supply components, vacuum system components, and an electron emitter configured to generate a beam of electrons that is accelerated into the beam column 105. The beam column 105, in turn, includes electromagnetic lens elements that are configured to shape and form the beam of electrons from the electron source into a substantially circular beam with a substantially uniform profile transverse to a beam axis A, and conditions the beam to be focused onto a sample 125 by an objective lens, as described in more detail in reference to FIG. 2.

The beam of electrons is typically characterized by a beam current and an accelerating voltage applied to generate the beam, among other parameters. The ranges of beam current and accelerating voltage can vary between instruments and are typically selected based on material properties of the sample or the type of analysis being conducted. Generally, however, beams of electrons are characterized by an energy from about 0.1 keV (e.g., for an accelerating voltage of 0.1 kV) to about 60 keV and a beam current from picoamperes to microamperes.

The vacuum chamber 110 and/or the beam column 105 can include multiple detectors for various signals, including but not limited to secondary electrons generated by interaction of the beam of electrons and the sample, BSEs, x-ray photons (e.g., EDAX), other photons (e.g., visible and/or IR cameras), and/or molecular species (e.g., TOF-SIMS). The vacuum chamber 110 can also include a sample stage 120 that can be operably coupled with a multi-axis translation/rotation control system, such that the sample 125 can be repositioned relative to the beam axis A, as an approach to surveying and/or imaging the sample 125. The sample stage 120 can include windows permitting transmission of electrons or other charged particles through the sample and the sample stage. In some embodiments, the charged particle microscope 100 can include detectors within the electron beam column 105, detectors arranged in an annular configuration at the end of the electron beam column 105 (for the detection of BSEs), and/or detectors below the sample stage 120 (for the detection of transmitted electrons from the beam of electrons in TEM/STEM). According to several embodiments of this disclosure, the charged particle microscope 100 can include a wide bandgap detector 130 configured to detect secondary electrons, as described in more detail below with respect to FIGS. 2A and 2B. The wide bandgap detector 130 may include a semiconductor layer 135 characterized by a bandgap of greater than about 2.0 eV. Additional detail about the semiconductor layer 135 is provided below with respect to FIG. 3.

The charged particle microscope 100 can incorporate an ion beam system (e.g., a focused ion beam, or FIB, a plasma focused ion beam, or PFIB, a broad ion beam, or other ion source) adapted, for example, to modify a sample or for microanalysis. Although the following description refers to a FIB as the ion beam system, the description should not be interpreted as limiting the embodiments of this disclosure to only FIB systems. Other ion beams, including PFIB and broad ion beams, may be used in charged particle microscopes. In addition, other particle beams, including laser beams, may be used in such systems.

As shown in FIG. 1, the charged particle microscope 100 can include FIB 115. Charged particle sensors of the present disclosure, including wide bandgap detector 130, can be configured to generate secondary electron data (e.g., images, line scans, etc.) in coordination with the FIB and the electron source used for modification and/or microanalysis of samples. For example, the ion source (e.g., a PFIB or the like) can be operably coupled with the vacuum chamber 110 and configured to incrementally remove portions of the sample 125 in a layer-wise manner. Between increments, secondary electron imaging (in conjunction with BSE imaging) of the sample 125 can show a surface topography, material contrast, channeling contrast, or charging contrast of the sample 125. Such imaging with the wide bandgap detector can be useful for verifying the correct removal of material (e.g., during sample/lamella preparation), quality assurance in semiconductor applications, as well as in other fields.

The FIB 115 can be configured to generate a beam of ions directed along beam axis B. As with the electron beam, the ion beam may be characterized by parameters including an accelerating potential and a beam current, as well as the type of ion provided by the source (e.g., gallium, gold, silicon, germanium in liquid metal ion sources, or oxygen, nitrogen, argon, xenon in plasma ion sources for PFIB). The FIB 115 can include electromagnetic elements to focus the ion beam into a suitable uniform profile transverse to the beam axis B and select for the species of ion (e.g., a Wien filter) in systems where such selection is appropriate. Ion beams may be characterized by accelerating voltages of a few hundred volts (e.g., 100-500 V) to several kilovolts (e.g., 30 kV), while the beam current can range from about a picoampere to a few microamperes (e.g., 0.8 pA-2.5 µA).

In some examples, the charged particle microscope 100 can include additional particle beams for milling or other operations, including a second ion beam source or a laser beam source. The laser beam may be in addition to or as an alternative to the FIB 115 in certain embodiments in which laser ablation/milling is performed.

Figure 2A:
FIG. 2A is a schematic diagram illustrating the operation of the example dual beam charged particle microscope of FIG. 1 as a scanning electron microscope, including various detectors, according to some embodiments.

FIG. 2A is a schematic diagram illustrating the operation of a dual beam charged particle microscope 200 configured as a scanning electron microscope, including various detectors, in accordance with some embodiments of the present disclosure. The dual beam charged particle microscope 200 may be an example of charged particle microscope 100 of FIG. 1. The detectors include the wide bandgap detector 130 as well as an Everhart-Thornley detector (ETD) 230. Not shown are other detectors and sources that can be coupled with the vacuum chamber 110 to augment the capabilities of the charged particle microscope 100, as an approach to focusing description on the configurations of wide bandgap detector 130 and ETD 230, configured to detect secondary electrons 244, 246. To that end, embodiments of the present disclosure include charged particle microscopes including x-ray sources, x-ray detectors, ion beam sources, mass spectrometers, optical sources (e.g., laser sources), or other sources as would be included in the compliment of analytical instruments available for use in SEM microanalysis. Configurations of detectors for detecting BSEs 242 may be included in the dual beam charged particle microscope 200, including a detector around the end of the electron beam column 105.

The dual beam charged particle microscope 200 shown in FIG. 2A includes both an ETD 230 and a wide bandgap detector 130. In many cases, it may be preferred to include the wide bandgap detector 130 without the ETD 230 in the dual beam charged particle microscope 200. For example, the space within the vacuum chamber (e.g., vacuum chamber 110) may be limited, so that fewer detectors are preferred. In some cases, the wide bandgap detector 130 can be used in conjunction with the ETD 230. The ETD 230 can include a collection grid 235. The collection grid 235 may be charged to low positive voltage (e.g., 250 V) to attract the relatively low energy secondary electrons 246 to the ETD 230. In some embodiments, the wide bandgap detector 130 can also include a collection grid to attract the secondary electrons 244. In other embodiments, the wide bandgap detector 130 can omit the collector grid. In such a configuration, the wide bandgap detector 130 may be placed in positions in the vacuum chamber of the dual beam charged particle microscope 200 more advantageous to the detection of secondary electrons, including, for example, closer to the sample surface or at various angular positions with respect to the beam of electrons 240.

When operating as a SEM, the dual beam charged particle microscope 200 can emit a beam of electrons 240 toward the sample 125. The interaction of the beam of electrons 240 can produce the BSEs 242 and secondary electrons 244, 246. The flux of secondary electrons 244, 246 may depend on the parameters of the beam of electrons 240 (e.g., beam current, accelerating potential) and the sample 125, but is typically less than a flux of secondary electrons produced during the operation of the FIB 115.

Figure 2B:
FIG. 2B is a schematic diagram illustrating the operation of the example dual beam charged particle microscope of FIG. 1 with an ion beam active, including the various detectors of FIG. 2A, according to some embodiments.

FIG. 2B is a schematic diagram illustrating the operation of an example dual beam charged particle microscope 250 with an ion beam 260 active, including the various detectors of FIG. 2A, according to some embodiments. The dual beam charged particle microscope 250 may be an example of dual beam charged particle microscope 200 of FIG. 2A. The FIB 115 can generate and focus the ion beam 260 toward the sample 125 to perform any of several operations, including milling, deposition, and the like. When the ions of the ion beam interact with the atoms of the sample 125, secondary electrons 262, 264 are emitted from the sample 125. The flux of secondary electrons 262, 264 may be greater than the flux of secondary electrons 244, 246 emitted during operation of the electron source producing the beam of electrons 240. The higher flux of secondary electrons 262 may saturate the ETD 230. While saturated, the ETD 230 may not be able to produce a usable signal for imaging the sample 125. In contrast, the wide bandgap detector 130 may not saturate due to the flux of secondary electrons 264, and may produce a usable signal for imaging the sample 125. Exemplary sample images during operation of a PFIB produced by an ETD and a wide bandgap detector are discussed below with respect to FIGS. 4, 5A, and 5B.

Figure 3:
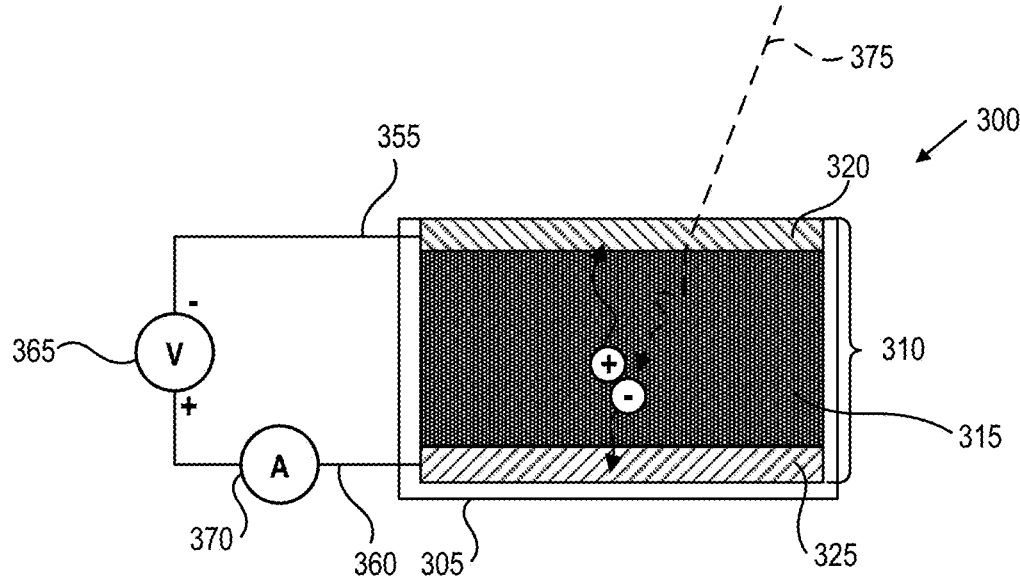
FIG. 3 is a schematic diagram of an example charged particle sensor, according to some embodiments.

FIG. 3 is a schematic diagram of an example charged particle sensor 300, according to some embodiments. The charged particle sensor 300 may be an example of a sensor element of a wide bandgap detector, including wide bandgap detector 130 described above with respect to FIG. 1. The charged particle sensor 300 includes detector cell 310 with acceptor layer 315, first conducting layer 320, and second conducting layer 325, mechanically coupled with housing 305. The housing 305 can be configured to be incorporated into a charged particle microscope system, for example the dual beam charged particle microscope 100 of FIG. 1. The housing 305 can include mechanical fittings, couplings, and/or features corresponding to a given charged particle microscope system. For example, a detector may be configured as a pole-piece mounted detector (PMD), in which the housing 305 can include one or more through-holes disposed in the housing corresponding to the position of threaded boreholes of a pole piece, facilitating mechanical coupling of the housing 305 with the pole piece. The pole piece can be differently configured in different dual beam charged particle microscope systems. For example, some manufactures can omit some features in favor of others, such that the configuration of the housing 305 can be based at least in part on the charged particle microscope into which the housing 305 is to be incorporated. In some examples, the housing 305 can be configured for mechanical coupling with a support (e.g., a retractable support) that can permit the charged particle sensor 300 to be positioned to collect secondary electrons or other particles (e.g., photons, BSEs, etc.). In these examples, the support can include tilt/rotation and/or linear translation.

The detector cell 310 can be mechanically coupled with the housing 305, for example, by adhesive, retaining clips, or the like. The first conducting layer 320 can be disposed on a first surface of the acceptor layer 315. The second conducting layer 325 can be disposed on a second surface of the acceptor layer 315. In some embodiments, the first conducting layer 320 and/or the second conducting layer 325 can be or include a metal, a transparent conductive material, a conductive carbon film, and/or other conductive materials compatible with chemical vapor deposition, physical vapor deposition, epitaxy, or other techniques used to deposit conductive materials with controlled purity and thickness on the order of tens to hundreds of nanometers. To that end, first conducting layer 320 can be characterized by a substantially uniform thickness (e.g., limited by and within tolerances of the fabrication method) below a threshold at which the conductive material interferes with incident particles (e.g., as determined by simulation of interaction volumes between secondary electrons/BSEs and the detector cell 310). The first conducting layer 320 can be disposed as a patterned film or patterned layer over the acceptor layer (e.g., in the shape of a grid or other geometric configuration) used to distribute the electrostatic field on the surface. In this case, the first surface will not be covered by material of the first conducting layer 320 in the mesh portions of the grid, which may improve detection of some of the incoming particles.

The example charged particle sensor 300 includes a first contact 355, a second contact 360, bias circuitry 365, and current measurement circuitry 370. The first contact 355 is electrically coupled with the first conducting layer 320. The second contact 360 is electrically coupled with the second conducting layer 325. In this way, the example charged particle sensor 300 can be configured to apply a bias voltage across the acceptor layer 315. For example, bias circuitry 365 can be configured to apply a bias voltage across the acceptor layer 315 having a magnitude from about 0.1 V to about 5 kV, including subranges, fractions, and interpolations thereof. In some embodiments, the magnitude of the bias voltage can be about 0.2 V, about 0.3 V, about 0.4 V, about 0.5 V, about 0.6 V, about 0.7 V, about 0.8 V, about 0.9 V, about 1.0 V, about 1.0 V, about 2.0 V, about 3.0 V, about 4.0 V, about 5.0 V, about 6.0 V, about 7.0 V, about 8.0 V, about 9.0 V, about 10.0 V, about 20 V, about 30 V, about 40

V, about 50 V, about 60 V, about 70 V, about 80 V, about 90 V, about 100 V, about 200 V, about 300 V, about 400 V, about 500 V, about 600 V, about 700 V, about 800 V, about 900 V, about 1.0 kV, about 1.5 kV, about 2.0 kV, about 2.5 kV, about 3.0 kV, about 3.5 kV, about 4.0 kV, about 4.5 kV, or about 5.0 kV, including fractions and interpolations thereof. Larger magnitudes of the bias voltage increase the likelihood that the charged particle sensor will interfere with the operation of the charged particle microscope (e.g., by forming local discharges or by deflecting and/or deforming the beam of primary electrons 240). In contrast, smaller magnitudes of the bias voltage can impair the performance of charged particle sensors of the present disclosure (e.g., by favoring electron-hole recombination).

Without being bound to a particular physical mechanism or phenomenon, charged particle sensors of the present disclosure can be configured to generate electrical signals in response to incidence of energetic particles 375 (e.g., secondary electrons 244 of FIG. 2A) onto the acceptor layer 315 (e.g., through orientation of the first conducting layer 320 toward the sample stage 120). Penetration of the energetic particles 375 into the acceptor layer can generate electron-hole pairs that can be separated and driven to respective conducting layers by force of the bias voltage. Current measurement circuitry 370 can be configured to integrate the current drawn from acceptor layer 315 and/or returned to the ground or relative ground over a period of time (e.g., coordinated with the scan pattern of the SEM as part of imaging or for a defined exposure time for spot-mode analysis). The magnitude of the bias voltage can be based at least in part on the thickness of the acceptor layer 315, as an approach to improving detector efficiency (e.g., by reducing the probability of electron-hole recombination in the acceptor layer 315). In this way, the bias voltage can be proportional to the thickness, from about 0.01 V to about 100 V per μm of the thickness, including subranges, fractions, and interpolations thereof. In some embodiments, the bias voltage can be about 0.01 V per μm, about 0.1 V per μm, about 0.5 V per μm, about 1.0 V per μm, about 2.0 V per μm, about 3.0 V per μm, about 4.0 V per μm, about 5.0 V per μm, about 6.0 V per μm, about 7.0 V per μm, about 8.0 V per μm, about 9.0 V per μm, about 10.0 V per μm, about 20.0 V per μm, about 30.0 V per μm, about 40.0 V per μm, about 50.0 V per μm, about 60.0 V per μm, about 70.0 V per μm, about 80.0 V per μm, about 90.0 V per μm, or about 100.0 V per μm, including interpolations and fractions thereof.

The acceptor layer 315 can be or include a semiconductor material characterized by a bandgap equal to or greater than about 2.0 eV. In some embodiments, the semiconductor material can be characterized by a bandgap from about 2.0 eV to about 6.5 eV, including sub-ranges, fractions, and interpolations thereof. To that end, the bandgap can be about 2.5 eV, about 3.0 eV, about 3.5 eV, about 4.0 eV, about 4.5 eV, about 5.0 eV, about 5.5 eV, about 6.0 eV, or about 6.5 eV, including fractions and interpolations thereof.

The material used for the acceptor layer 315 can be selected in line with criteria for bandgap, radiation hardness, and/or manufacturability. To that end, the semiconducting material of the acceptor layer 315 can be or include $sp^3$ hybridized carbon (e.g., diamond, diamond-like carbon, etc.). The $sp^3$ hybridized carbon can be characterized by a concentration of impurities equal to or less than about 5 ppb, which can also be referred to as "electronics grade." The $sp^3$ hybridized carbon can be synthesized as a conformal coating on various substrates by synthesis from dissociated carbon source gases (e.g., chemical vapor deposition), to form single crystal diamond, polycrystalline diamond, diamond-like carbon, or the like. In this way, the acceptor layer 315 can be characterized by at least a region of material having a bandgap of about 5.5 eV.

In some embodiments, the semiconducting material includes one or more materials selected from a group consisting of silicon carbide (2.3-3.3 eV), single crystalline diamond (5.5 eV), polycrystalline diamond (5.5 eV), gallium nitride (3.4 eV), gallium phosphide (2.26 eV), cadmium sulfide (2.42 eV), aluminum phosphide (2.45 eV), zinc selenide (2.7 eV), zinc sulfide (3.6 eV), or aluminum nitride (6.2 eV). The values provided describe the innate bandgap of the corresponding material, which can be modified through doping during synthesis to be higher or lower than the stated value. The bandgap can be an inherent property of a material, but can also be modified by doping with P-type or N-type dopants (e.g., doped silicon narrowgap materials).

Example charged particle sensor 300 can be configured to be incorporated into example charged particle microscope 100 of FIG. 1 (e.g., as wide bandgap detector 130). The discussion above with respect to FIG. 3 is provided to describe electronic and material aspects of charged particle sensors of the present disclosure.

Figure 4:
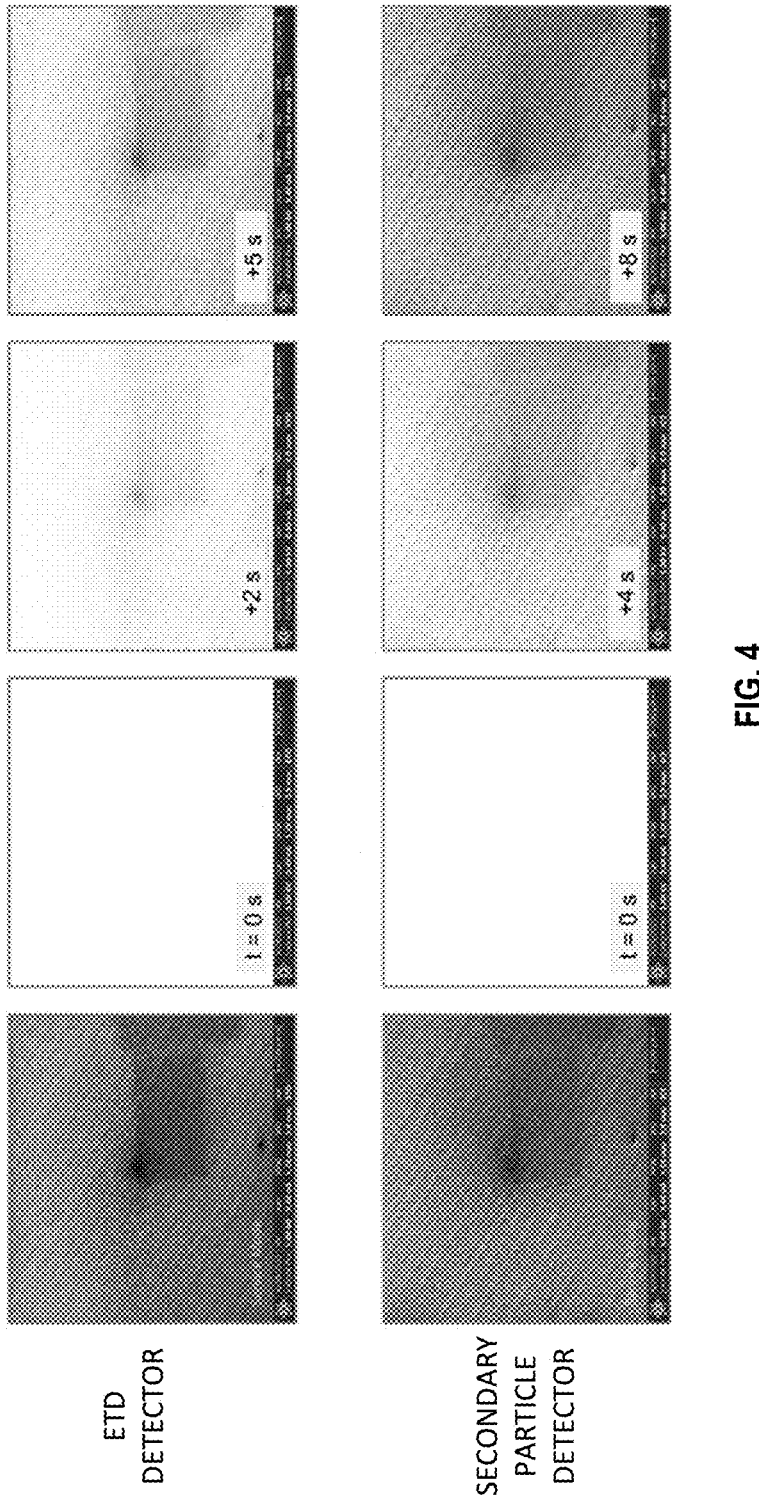
FIG. 4 shows two sequences of images from two scintillator detectors illustrating the saturation and recovery of the scintillators after application of an ion beam to a sample, according to some embodiments.

FIG. 4 shows two sequences of images from two scintillator detectors illustrating the saturation and recovery of the scintillators after application of an ion beam to a sample, according to some embodiments. The top sequence of images is produced from an ETD detector view the surface of a sample. The bottom sequence of images is produced from a secondary electron detector view of the surface of the sample. The secondary particle detector is similar to an ETD in the use of a scintillator element coupled to a photomultiplier to detect ions and/or secondary electrons generated from the interaction of the ions in a beam with the atoms of a sample (e.g., secondary ions). As shown in FIG. 4, the secondary particle detector is configured to detect secondary electrons from the sample.

Since both the ETD and secondary particle detector use scintillators, the generation of a high flux of detectable particles (e.g., secondary electrons detected by the ETD or secondary particle detector) can saturate the scintillators. For each sequence, the leftmost image shows the sample surface imaged using the respective detector prior to the activation of an ion beam (e.g., FIB 115 of FIG. 1). The second image in each sequence shows an image produced using the respective detectors after the ion beam has been activated. The time t=0 s denotes the time at which the ion beam was deactivated. As shown by the second image, both the ETD and the secondary particle detector are fully saturated and produce no discernible features of the sample surface seen in the first image in each sequence.

The third and fourth images in each sequence are acquired a few seconds after the second image. For the ETD detector, the third image is produced at t=2 s and the fourth image is produced at t=5 s, while for the secondary particle detector the third image is produced at t=4 s and the fourth image is produced at t=8 s. After two seconds, the ETD detector is still saturated. The rectangular regions of the sample are faintly discernible, but other features are not resolved. After five seconds, the saturation has relaxed somewhat more, but the image remains noticeably washed out, with excess signal detectable across the entire sample. Similarly, after four seconds and eight seconds the secondary particle detector is also remains saturated, but the saturation is relaxing. After eight seconds, the images produced by the secondary particle detector are close to the images produced prior to saturation from the operation of the ion beam. Saturation of the scintillator elements can persist for ten seconds or longer, depending on the material used for the scintillator elements. As illustrated by FIG. 4, the saturation typically must relax completely before useable images can be produced from the conventional scintillator detectors.

Figures 5A, 5B:
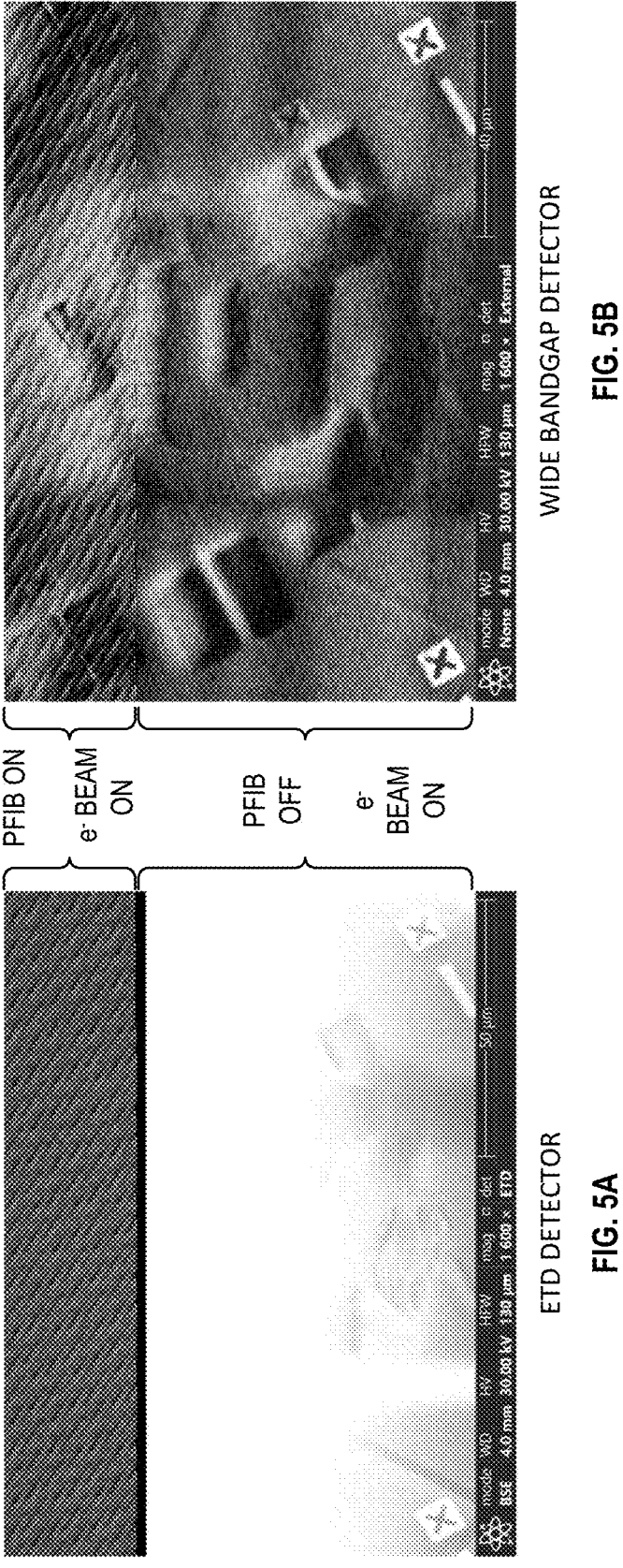
FIG. 5A is an image from a scintillator detector generated as an ion beam is first applied to a sample and then stopped and an electron beam applied to the sample, according to some embodiments.
FIG. 5B is an image from a wide bandgap detector generated as an ion beam is first applied to the sample and then stopped and an electron beam applied to the sample, according to some embodiments.

FIG. 5A is an image from a scintillator detector (e.g., an ETD) generated as an ion beam is first applied to a sample and then stopped and an electron beam applied to the sample, according to some embodiments. FIG. 5B is an image from a wide bandgap detector (e.g., wide bandgap detector 130 of FIG. 1) generated simultaneously with the image of FIG. 5A.

Because the images from the ETD detector and the wide bandgap detector for a SEM system are generated via a raster of a beam of electrons across the sample (e.g., a sweep of the beam in a grid pattern), each row of pixels in the image may be generated as the beam of electrons moves across the sample. The speed of the sweep of the beam of electrons can be adjusted; a typical fast sweep time for a row may be about 100 µs, and slower sweep times can be used. The resulting full raster of the sample can take from several milliseconds to produce (30-50 ms) to a few seconds (1-2 s). Thus, the images are produced with time increasing as the raster moves from the top of the images to the bottom. For the first portion of the image generation an ion beam (e.g., PFIB) is on and directed to a portion of the sample. After a period of time, the ion beam is deactivated. For FIGS. 5A and 5B, the electron beam remained active for the entire image generation. In some examples, the electron beam and the ion beam may be activated and deactivated alternately.

While the ion beam is active, the ETD detector saturates due to the flux of secondary electrons emitted from the sample. As shown in FIG. 5A, when the ion beam is deactivated, the ETD is fully saturated. As the raster progresses (downward in the image), time elapses and the ETD scintillator begins to relax. Detail of the sample surface, including the fiducial marks, becomes more discernible but saturation artifacts remain throughout the image.

By contrast, the wide bandgap detector exhibits no saturation and a useable signal for generating an image can be acquired effectively immediately after the deactivation of the ion beam and activation of the electron beam, as illustrated in FIG. 5B. By "effectively immediately," the useable signal may be acquired within the response time of the detector to the activation of the electron beam and may correspond to the per pixel dwell time of the raster scan speed, which can be about 1 µs. The wide bandgap detector is also sensitive to secondary electrons produced while the ion beam is active, revealing features of the sample surface (albeit with some distortion) during the ion beam operation that cannot be detected with a conventional ETD. ETDs and other detectors that use scintillators may also be capable of revealing features of the sample surface during the ion beam operation unless they are saturated. Because the raster sweep time to produce a full row of an image can be about 100 µs, a usable signal for producing an undistorted row of image pixels can be acquired by the wide bandgap detector in less than about 100 µs after deactivation of the ion beam. Since effectively no delay between operations (e.g., milling) with an ion beam and imaging with an electron beam is necessary before useable images can be acquired, switching alternately between the ion beam and the electron beam can proceed with delays only limited by the controlling electronics (e.g., on the order of milliseconds). Thus, a milling operation can be verified and guided by SEM imaging at a substantially higher rate, increasing the throughput of the milling (or other ion beam) operations.

Figure 6:
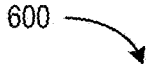
FIG. 6 is a schematic diagram of a wide bandgap detector in a dual beam charged particle microscope system positioned close to a sample, according to some embodiments.

FIG. 6 is a schematic diagram of a wide bandgap detector 630 in a dual beam charged particle microscope system 600 positioned close to a sample 625, according to some embodiments. The dual beam charged particle microscope system 600 may be an example of dual beam charged particle microscope 100 of FIG. 1, including electron beam column 605 and FIB 615 that can generate a beam of electrons and a beam of ions, respectively. The dual beam charged particle microscope system 600 can include an ETD 635 in addition to the wide bandgap detector 630.

As illustrated in FIG. 6, the ETD 635 may be positioned within the vacuum chamber of the dual beam charged particle microscope system 600 at a first distance 645 from the sample 625. For example, the end of the ETD 635 having the collection grid may be placed at about 10 cm from the sample (e.g., the first distance 645 is about 10 cm). The scintillator of the ETD 635 can have a high accelerating potential (e.g., 10 kV), resulting in deflections or alterations of the beam of electrons if the end of the ETD 635 is positioned close to the sample and/or beam axis during operation of the system in SEM, TEM, or STEM modes.

The wide bandgap detector 630 may be positioned within the vacuum chamber of the dual beam charged particle microscope system 600 at a second distance 640 from the sample 625. Because the biasing voltage can be lower across the acceptor material (e.g., acceptor layer 315 of FIG. 3) of the wide bandgap detector 630, the wide bandgap detector 630 can be positioned closer to the sample than the ETD 635. In addition, the wide bandgap detector 630 may operate without a collection grid (or with a collection grid having no applied voltage). For example, the end of the wide bandgap detector 630 may be positioned as close as 7 mm from the sample during operation without significantly affecting the beam of electrons and maintaining image quality. In some embodiments, the second distance 640 can be between about 7 mm and 10 cm. Depending on the characteristics of the sample (e.g., material, surface profile, etc.), the secondary electrons emitted during operation of the electron beam may be preferentially emitted within an angular distribution with respect to the beam axis. For example, improved detection of secondary electrons may be achieved with a detector positioned at an angle of 45° from the beam axis, or with a detector positioned at an angle of greater than 45° from the beam axis, including, for example, 50°, 60°, 75°, or about 90° from the beam axis (and/or fractions and interpolations of these angular positions). The ability to position the wide bandgap detector 630 at a second distance 640 that is significantly closer than a conventional ETD 635 can allow for angular positioning of the wide bandgap detector 630 at locations that improve the detection of secondary electrons.

In some embodiments, the dual beam charged particle microscope system 600 can operate without the ETD 635 and only with the wide bandgap detector 630. For example, the wide bandgap detector 630 may replace an ETD or other scintillator detectors in charged particle microscope systems. Replacing an ETD may free space within the limited volume of the vacuum chamber of the dual beam charged particle microscope system 600, allowing for improved positioning of the wide bandgap detector 630 or providing space for additional wide bandgap detectors. For example, in some embodiments, the dual beam charged particle microscope system 600 can include two or more wide bandgap detectors positioned at different locations within the vacuum chamber to acquire secondary electron signals according to two different orientations relative to the sample 625 simultaneously.

Figure 7:
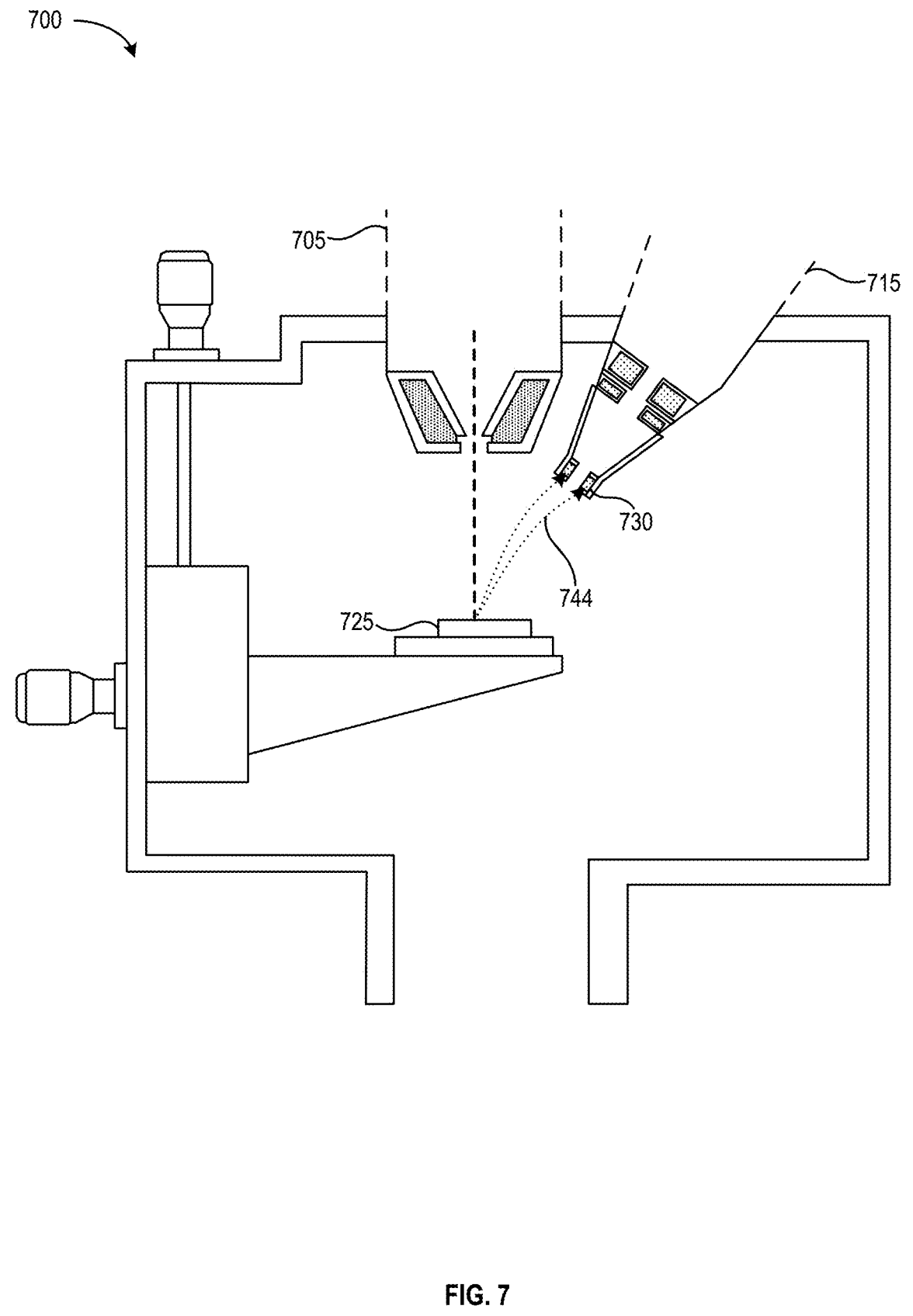

FIG. 7 is a schematic diagram of a wide bandgap detector 730 in a dual beam charged particle microscope 700 positioned at an end of an ion beam column, according to some embodiments. The dual beam charged particle microscope 700 may be an example of dual beam charged particle microscope 100 of FIG. 1, including electron beam column 705 and FIB 715 that can generate a beam of electrons and a beam of ions, respectively.

In the embodiment illustrated in FIG. 7. The wide bandgap detector 730 may be arranged annularly and positioned at the end of the beam column of the FIB 715. The annular arrangement can include an aperture in the middle of the annular arrangement to allow passage of the ion beam during operation. The detector cell can be shaped to accommodate the aperture. For example, the aperture can extend through the detector cell and perforate the first conducting layer (e.g., first conducting layer 320), the acceptor layer (e.g., acceptor layer 315), and the second conducting layer (e.g., second conducting layer 325), such that the detector cell can be positioned around the beam axis (e.g., beam axis B), with the first conducting layer oriented facing the sample 725. In some embodiments, the wide bandgap detector 730 can include more than one detector cell (e.g., segment including separate acceptor and conductor layers) arranged as sectors of the annular configuration or as concentric detector cells. The positioning of the wide bandgap detector 730 at the end of the ion beam column of FIB 715 may be advantageous during electron beam operation due to the position of the end of the ion beam column relative to the sample and/or by allowing an additional wide bandgap detector to be placed in the location of the ion beam column. The wide bandgap detector 730 can detect secondary electrons 744 emitted from the sample 725 during operation of the electron beam. Additionally, positioning of the wide bandgap detector 730 at the end of the ion beam column may allow for improved detection of energetic particles, including secondary electrons, during operation of the ion beam.

Figure 8:
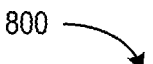
FIG. 8 is a flow diagram of an example process for operating a dual beam charged particle microscope system with a wide bandgap detector, according to some embodiments.
Figure 8:
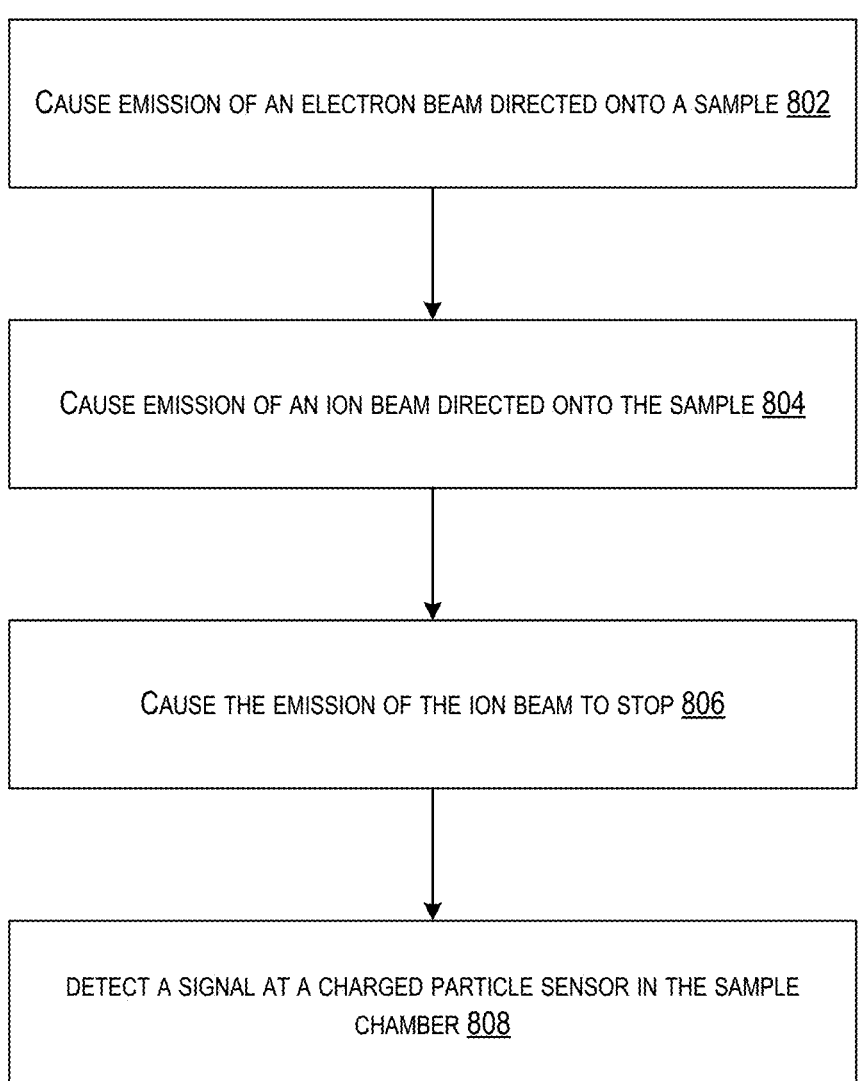

FIG. 8 is a flow diagram of an example process 800 for operating a charged particle microscope system with a charged particle sensor, according to some embodiments. The charged particle microscope system may be an example of other charged particle microscope systems described herein, including dual beam charged particle microscope system 100 of FIG. 1. The charged particle sensor may be an example of the wide bandgap detectors described herein, including wide bandgap detector 130 of FIG. 1. The charged particle microscope system can include a computer system configured to carry out the operations of process 800. For example, a computer system may be configured to adjust the parameters of the electron beam (e.g., accelerating potential, beam focus parameters, beam current, beam deflection, etc.), the ion beam (e.g., accelerating potential, beam focus parameters, ion species selection, beam current, etc.), the scanning/imaging parameters for SEM and/or STEM modes (e.g., sweep time, dwell time, etc.), activation/deactivation of both the electron beam and the ion beam (or additional beams, e.g., laser beams, present in multiple beam systems), detector settings (e.g., biasing voltage, collector grid voltage, etc.), and other suitable parameters for the operation of such a microscopy system.

At block 802, the charged particle microscope system can cause emission of an electron beam. The electron beam can be emitted from an electron source and focused/shaped using one or more electromagnetic components in an electron beam column (e.g., electron beam column 105 of FIG. 1). The electron beam can be directed onto a sample positioned in a sample chamber (e.g., the vacuum chamber 110 of FIG. 1) of the charged particle microscope system. When the electron beam interacts with the atoms of the sample, the electron beam can generate a first flux of detectable particles. The detectable particles can include secondary electrons, BSEs, photons, ions, and the like.

At block 804, the charged particle microscope system can cause emission of an ion beam. The ion beam can be emitted from an ion source (e.g., FIB 115 of FIG. 1). The ion beam can be directed onto the sample positioned in the sample chamber of the charged particle microscope system. When the ion beam interacts with the atoms of the sample, the ion beam can generate a second flux of detectable particles. The detectable particles can include ions, secondary electrons, photons, and the like.

At block 806, the charged particle microscope system can cause the ion beam to stop. The ion beam may be operated to, for example, remove a portion of the sample. Once the portion of the sample has been removed, emission of the ion beam can be stopped.

At block 808, the charged particle microscope system can detect a signal at a charged particle sensor in the sample chamber. The charged particle sensor can include a detector cell having a semiconductor layer characterized by a band-gap equal to or greater than about 2.0 eV. The signal can be produced by the first flux of detectable particles associated with the electron beam. For example, the first flux of detectable particles can be a first flux of secondary electrons generated by the electron beam based on an interaction between the electron beam and a sample in the sample chamber. In some embodiments, the signal can be used to generate an image of the surface of the sample. In some embodiments, the first flux of detectable particles can be a first flux of backscattered electrons produced by a scattering of the electron beam from the sample in the sample chamber.

In some examples, the charged particle sensor can be configured to detect a signal produced by detectable particles produced by an ion beam. For example, the electron beam may be deactivated and the ion beam activated to perform imaging, with the charged particle sensor configured to detect secondary electrons produced by the interaction of the ion beam with the sample.

In some embodiments, the operation of the charged particle microscope system can include directing the electron beam onto the sample while the ion beam is directed onto the sample. For example, the electron beam may be directed onto the sample to perform imaging of the sample while the ion beam is activated, as shown with respect to FIGS. 5A and 5B. In some embodiments, directing the electron beam onto the sample can occur after the ion beam has been deactivated. For example, the electron beam may be deactivated (or directed away from the sample) during operation of the ion beam. After the ion beam is deactivated, the electron beam may be activated and directed onto the sample.

In some embodiments, detecting the signal at the charged particle sensor can occur after a desaturation of the charged particle sensor. The desaturation of the charged particle sensor can occur less than about 100 μs after causing the emission of the ion beam to stop. The charged particle sensor can be saturated by the second flux of detectable particles. For example, the second flux of detectable particles can include secondary electrons generated by the interaction of the ion beam with the atoms of the sample. In this way, a usable signal can be detected at the charged particle sensor within about 100 μs after stopping the emission of the ion beam. In some embodiments, causing the emission of the electron beam can occur less than about 100 μs after causing the emission of the ion beam to stop.

In some embodiments, detecting the signal at the charged particle sensor can omit the use of a conductive collector mesh coupled to the charged particle sensor. In some embodiments, the conductive collector mesh may be absent entirely from the charged particle sensor. In other embodiments, the conductive collector mesh may be coupled to the charged particle sensor but may not have a voltage applied when detecting the signal.

Although the above description with respect to FIG. 8 and process 800 make reference to charged particle microscope systems using an ion beam, systems that incorporate a laser beam or other suitable particle beam instead of or in addition to the ion beam are contemplated. For example, a laser beam may be substituted for the ion beam in process 800 in embodiments in which the charged particle microscope system uses a laser beam for milling, ablation, surface preparation, or the like.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on electron microscopy systems, and dual beam SEM systems in particular, these are meant as non-limiting, illustrative embodiments. Embodiments of the present disclosure are not limited to such materials, but rather are intended to address charged particle beam systems for which a wide array of particles can be applied to imaging, microanalysis, and/or processing of materials on an atomic scale. Such particles may include, but are not limited to, electrons, ions, or photons in TEM systems, SEM systems, STEM systems, ion beam systems, and/or particle accelerator systems.

Some embodiments of the present disclosure include a system including one or more data processors and/or logic circuits. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein, including, for example, process 800 of FIG. 8.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For dimensional values, such as diameters, lengths, widths, or the like, the term "about" can be understood to describe a deviation from the stated value of up to ±10%. For example, a dimension of "about 10 mm" can describe a dimension from 9 mm to 11 mm. In the present disclosure, "sub-ranges" refers to a range of values between the two stated extents and/or including one of the two stated extents.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A charged particle microscope system comprising:

a vacuum chamber;

a sample stage disposed in the vacuum chamber and configured to receive a sample to be tested in the vacuum chamber;

a first beam source operable to direct a first particle beam into the vacuum chamber toward the sample stage;

a second beam source operable to direct a second particle beam into the vacuum chamber toward the sample stage;

a first charged particle sensor disposed at a first location in the vacuum chamber and comprising a detector cell, the detector cell having a semiconductor layer electrically biased across at a first level and characterized by a bandgap equal to or greater than about 2.0 eV, and the first charged particle sensor oriented to detect secondary electrons generated based on an interaction between the first particle beam or the second particle beam and a sample disposed on the sample stage; and a second charged particle sensor disposed at a second location in the vacuum chamber and comprising a scintillator detector electrically biased at a second level greater than the first level, the second charged particle sensor configured to be saturated from electrons generated based on an interaction between the second particle beam and the sample disposed on the sample stage.

2. The charged particle microscope system of claim 1, wherein the first level is about 1 kV.

3. The charged particle microscope system of claim 1, wherein the second level is about 10 kV.

4. The charged particle microscope system of claim 1, wherein the first location is closer to the sample stage than the second location.

5. The charged particle microscope system of claim 1, wherein a distance between the first location and the sample stage is about 7 mm to about 10 cm.

6. The charged particle microscope system of claim 1, wherein a distance between the second location and the sample stage is about 10 cm.

7. The charged particle microscope system of claim 1, wherein the semiconductor layer comprises one or more materials selected from a group consisting of silicon carbide, single crystalline diamond, polycrystalline diamond, gallium nitride, gallium phosphide, cadmium sulfide, aluminum phosphide, zinc selenide, zinc sulfide, and aluminum nitride.

8. The charged particle microscope system of claim 1, wherein the first particle beam is an electron beam.

9. The charged particle microscope system of claim 1, wherein the second particle beam is an ion beam, or wherein the second particle beam is a laser beam.

10. The charged particle microscope system of claim 9, wherein the ion beam is configured for milling or polishing.

* * * * *